(12) United States Patent
Hashikawa et al.

(10) Patent No.: US 10,157,595 B2
(45) Date of Patent: Dec. 18, 2018

(54) DISPLAY CONTROL DEVICE

(71) Applicant: AISIN SEIKI KABUSHIKI KAISHA, Kariya-shi, Aichi-ken (JP)

(72) Inventors: Takuya Hashikawa, Nagoya (JP); Naotaka Kubota, Kariya (JP); Yoji Inui, Ama-gun (JP); Morio Sakai, Toyota (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 3 days.

(21) Appl. No.: 15/593,641

(22) Filed: May 12, 2017

(65) Prior Publication Data

US 2017/0372682 A1 Dec. 28, 2017

(30) Foreign Application Priority Data

Jun. 28, 2016 (JP) ................... 2016-127808

(51) Int. Cl.
| | |
|---|---|
| *G09G 5/377* | (2006.01) |
| *B60R 1/00* | (2006.01) |
| *G01C 21/26* | (2006.01) |
| *G06T 11/60* | (2006.01) |
| *H04N 7/18* | (2006.01) |

(52) U.S. Cl.
CPC ............. *G09G 5/377* (2013.01); *B60R 1/00* (2013.01); *B60R 1/002* (2013.01); *G01C 21/265* (2013.01); *G06T 11/60* (2013.01); *H04N 7/181* (2013.01); *B60R 2300/107* (2013.01); *B60R 2300/307* (2013.01); *B60R 2300/607* (2013.01); *B60R 2300/802* (2013.01); *B60R 2300/8093* (2013.01)

(58) Field of Classification Search
CPC .................................................... B62D 15/025
See application file for complete search history.

(56) References Cited

U.S. PATENT DOCUMENTS

| | | | |
|---|---|---|---|
| 2012/0158256 A1 | 6/2012 | Kuboyama et al. | |
| 2014/0176350 A1* | 6/2014 | Niehsen | B62D 15/025 340/988 |
| 2015/0094945 A1* | 4/2015 | Cheng | G01C 21/34 701/408 |
| 2015/0179219 A1* | 6/2015 | Gao | G06K 9/00664 386/278 |
| 2015/0210312 A1* | 7/2015 | Stein | B60W 30/00 701/41 |

FOREIGN PATENT DOCUMENTS

WO 2011/010346 A1 1/2011

* cited by examiner

*Primary Examiner* — Jitesh Patel
(74) *Attorney, Agent, or Firm* — Sughrue Mion, PLLC

(57) ABSTRACT

A display control device includes: a reception unit that receives an input for designating a first point on a first image, which is displayed on a display screen provided in a vehicle compartment and shows a peripheral environment of a vehicle at a first timing; a display processing unit that displays a first display object at the first point; a specifying unit that specifies a second point at which a first target, which is located at the first point, is located on a second image, which shows the peripheral environment of the vehicle at a second timing after the first timing; and an update unit that displays, along with the second image, the first display object at the second point on the second image.

8 Claims, 11 Drawing Sheets

DISPLAY CONTROL DEVICE

CROSS REFERENCE TO RELATED APPLICATIONS

This application is based on and claims priority under 35 U.S.C. § 119 to Japanese Patent Application 2016-127808, filed on Jun. 28, 2016, the entire contents of which are incorporated herein by reference.

TECHNICAL FIELD

Embodiments disclosed here relate to a vehicle display control device.

BACKGROUND DISCUSSION

In the related art, there is a technique to capture an image of a peripheral environment of a vehicle using a camera provided in the vehicle and provide the captured image to a driver via a display screen provided within a vehicle compartment. See, for example, International Publication No. WO 2011/010346.

However, for example, there is a case in which a driver does not know where a rock, to which once the driver paid attention on the display screen during the traveling on an off-road terrain such as a rocky region, is being displayed on the display screen while continuing the driving.

Thus, a need exists for a display control device which is not susceptible to the drawback mentioned above.

SUMMARY

As one example, a display control device according to an aspect of this disclosure includes: a reception unit that receives an input for designating a first point on a first image, which is displayed on a display screen provided in a vehicle compartment and shows a peripheral environment of a vehicle at a first timing; a display processing unit that displays a first display object at the first point; a specifying unit that specifies a second point at which a first target, which is located at the first point, is located on a second image, which shows the peripheral environment of the vehicle at a second timing after the first timing; and an update unit that displays, along with the second image, the first display object at the second point on the second image. Accordingly, since the first display object is adapted to follow the position at which the target designated by a user is located, the display control device may display the target to which the user is paying attention, in an easily intelligible manner.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an example in which a display control device of the present embodiment is mounted in a vehicle 1 will be described.

Embodiment

The vehicle 1 of the embodiment may be, for example, a vehicle having an internal combustion engine (not illustrated) as a drive source, i.e. an internal combustion vehicle, a vehicle having an electric motor (not illustrated) as a drive source, i.e. an electric vehicle or a fuel cell vehicle, a hybrid vehicle having both the internal combustion engine and the electric motor as a drive source, and a vehicle having any other drive source. In addition, in the vehicle 1, various transmission devices may be mounted, and various devices required to drive the internal combustion engine and the electric motor, for example, systems or parts may be mounted. In addition, for example, the method, the number, and the layout of devices related to the driving of wheels 3 in the vehicle 1 may be set in various ways.

Figure 1:
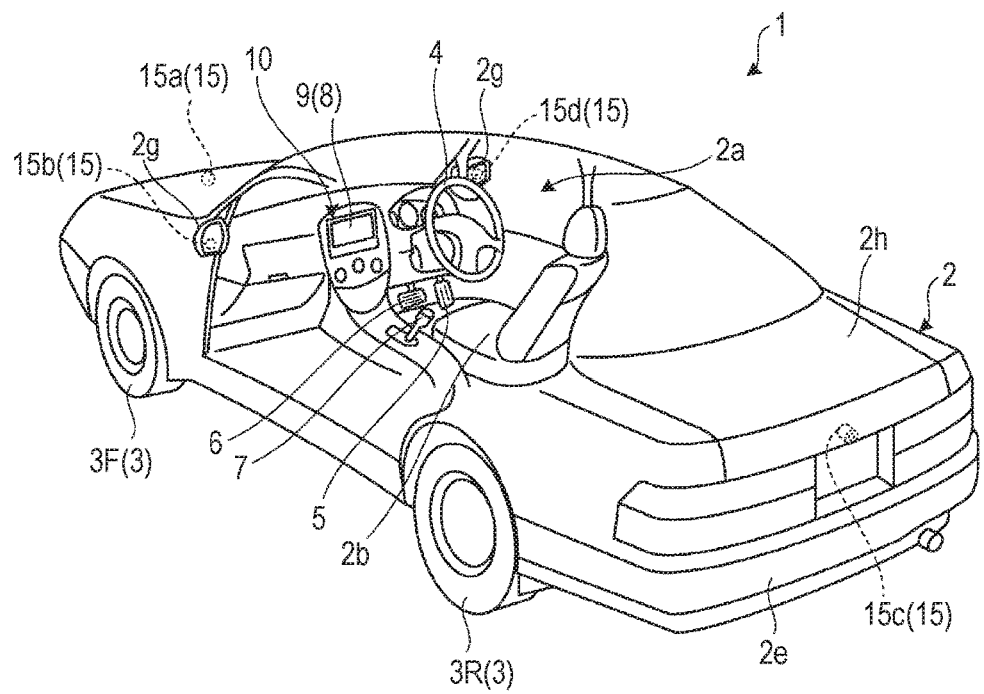
FIG. 1 is a perspective view illustrating an exemplary vehicle mounted with a display control device according to an embodiment in which a vehicle compartment is partially viewed.
Figure 2:
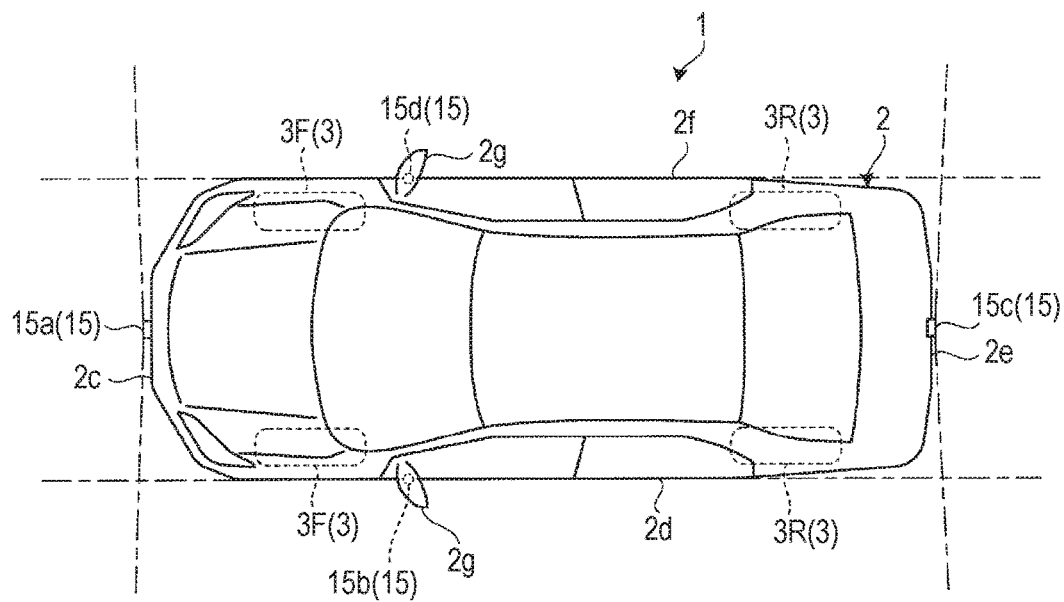
FIG. 2 is a plan view (overhead view) illustrating the exemplary vehicle mounted with the display control device according to the embodiment is mounted.
Figure 3:
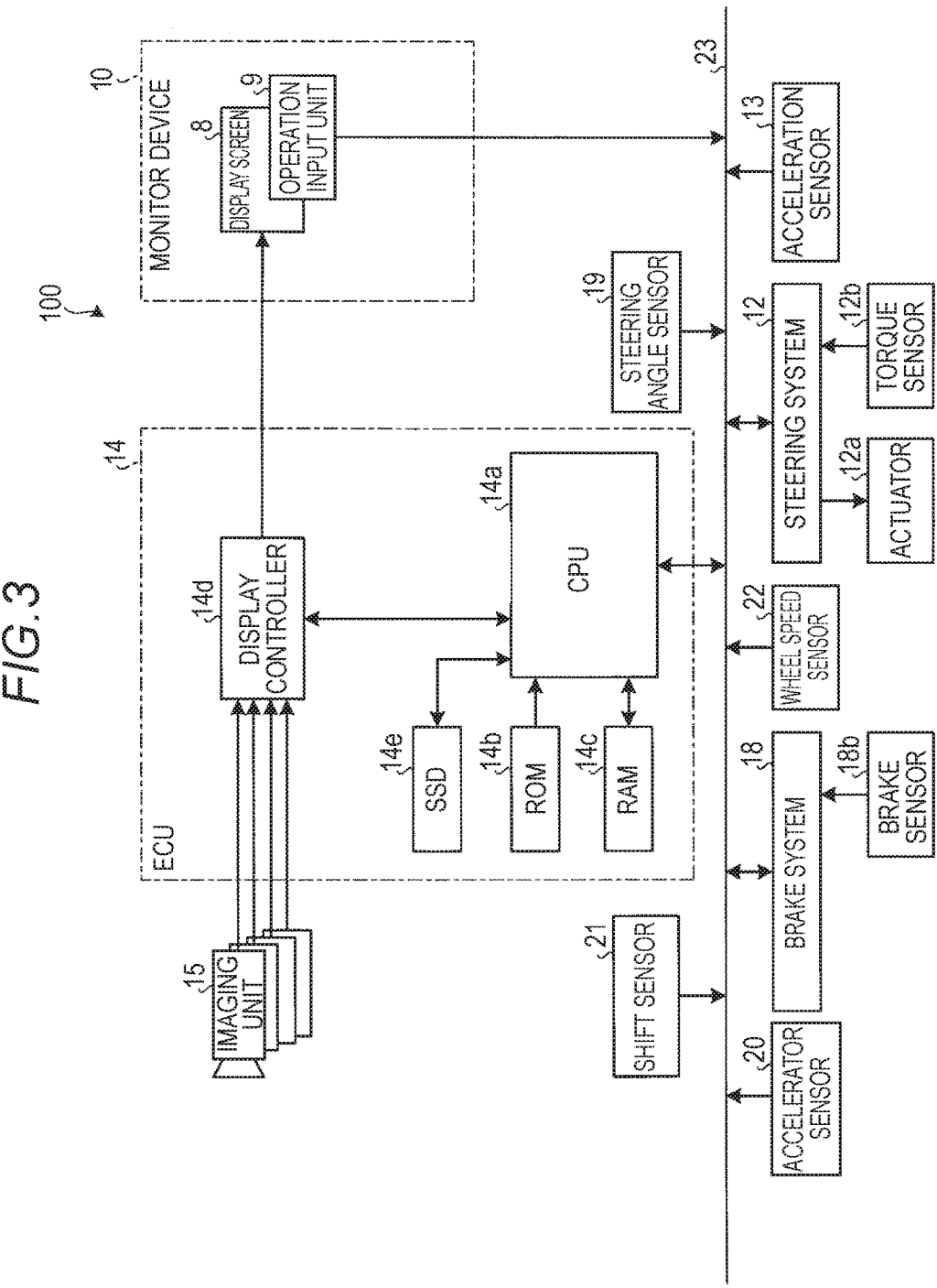
FIG. 3 is a block diagram illustrating an exemplary display control system including the display control device according to the embodiment.

FIG. 1 is a perspective view illustrating an exemplary vehicle 1 mounted with a display control device according to an embodiment, in which a vehicle compartment 2a of the vehicle 1 is partially viewed. FIG. 2 is a plan view (overhead view) illustrating the exemplary vehicle 1 mounted with the display control device according to the embodiment. FIG. 3 is a block diagram illustrating an exemplary configuration of a display control system 100 having the display control device according to the embodiment.

As exemplified in FIG. 1, a vehicle body 2 configures the vehicle compartment 2a in which a user (not illustrated) gets. In the vehicle compartment 2a, for example, a steering unit 4, an acceleration operation unit 5, a braking operation unit 6, and a gear shift operating unit 7 are provided in a state of facing a seat 2b of a driver as the user. The steering unit 4 is, for example, a handle that protrudes from a dashboard, the acceleration operation unit 5 is, for example, an accelerator pedal that is located below the driver's feet, the braking operation unit 6 is, for example, a brake pedal that is located below the driver's feet, and the gear shift operating unit 7 is, for example, a shift lever that protrudes from a center console. Meanwhile, the steering unit 4, the acceleration operation unit 5, the braking operation unit 6, and the gear shift operating unit 7 are not limited thereto.

In addition, in the vehicle compartment 2a, a monitor device 10 having a display screen 8 is provided. The display screen 8 is configured by, for example, a liquid crystal display (LCD) or an organic electroluminescent display (OELD). In addition, the display screen 8 is covered with a transparent operation input unit 9. The operation input unit 9 is, for example, a touch panel. The user may view an image displayed on the display screen 8 through the operation input unit 9. In addition, the user may execute an operation input by operating, i.e. touching, pushing, or moving the operation input unit 9 with, for example, the finger at the position that corresponds to the image displayed on the display screen 8. The monitor device 10 is installed, for example, in the center portion of the dashboard in the vehicle width direction of the dashboard, i.e. in the left-and-right direction. In addition, the monitor device 10 may include an operation input unit in addition to the touch panel. For example, the monitor device 10 may be provided with a switch, a dial, a joystick, or a push button as another operation unit. The monitor device 10 may also be used as, for example, a navigation system or an audio system.

In addition, as illustrated in FIGS. 1 and 2, in this embodiment, for example, the vehicle 1 is a four-wheel vehicle, and includes two left and right front wheels 3F and two left and right rear wheels 3R. In addition, for example, the tire angle of the front wheels 3F is changed in response to an operation of the steering unit 4. As illustrated in FIG. 3, the vehicle 1 includes a steering system 12 that steers at least two wheels 3. The steering system 12 includes an actuator 12a and a torque sensor 12b. The steering system 12 is electrically controlled by, for example, an electronic control unit (ECU) 14, and operates the actuator 12a. The steering system 12 is, for example, an electric power steering system or a steer by wire (SBW) system. The steering system 12 supplements steering force by applying a torque, i.e. assistance torque to the steering unit 4 by the actuator 12a, or steers the wheels 3 by the actuator 12a. In this case, the actuator 12a may steer one wheel 3, or may steer multiple vehicle wheels 3. In addition, the torque sensor 12b detects, for example, the torque applied by the driver to the steering unit 4.

In addition, in this embodiment, as illustrated in FIG. 2, the vehicle 1 is provided with an imaging unit 15 (here, four imaging units 15a to 15d) that images the peripheral environment of the vehicle 1. Each imaging unit 15 is an imaging device that may include an imaging element such as a charge coupled device (CCD) or a CMOS image sensor (CIS), and may capture an image, in which the peripheral environment is captured, by the imaging element. Each imaging unit 15 may output image data at a predetermined frame rate.

In this embodiment, the imaging unit 15a is provided on a front end 2c of the vehicle body 2 (e.g., a front grill). The imaging unit 15a may capture an image of the peripheral environment in the front direction of the vehicle 1. However, the direction in which the driver who seats in the seat 2b faces the front side, i.e. the vehicle front glass side viewed from the driver is referred to as the front direction of the vehicle 1 and the front side of the vehicle body 2. The imaging unit 15b is provided at a left end 2d of the vehicle body 2, more specifically on a left door mirror 2g. The imaging unit 15c is provided in a rear end 2e of the vehicle body 2, more specifically, on a wall portion below a rear trunk door 2h. The imaging unit 15c may capture an image of the peripheral environment in the rear direction of the vehicle 1. The imaging unit 15d is provided at a right end 2f of the vehicle body 2, more specifically, on a right door mirror 2g. The imaging unit 15d may capture an image of the peripheral environment in the right direction of the vehicle 1.

Here, the peripheral environment means the situation around the vehicle 1. In an example, the peripheral environment includes the road surface around the vehicle 1. In addition, so long as each imaging unit 15 may output an image in which the peripheral environment of the vehicle 1 is captured, the configuration of each imaging unit 15, the number of imaging units 15, the region where each imaging unit 15 is installed, and the direction of each imaging unit 15 are not limited to the above description. The ranges that may be captured by the multiple imaging units 15 may overlap each other, or may not overlap.

As illustrated in FIG. 3, in the display control system 100, the monitor device 10, an acceleration sensor 13, the electronic control unit (ECU) 14, a brake system 18, a steering angle sensor 19, an accelerator sensor 20, a shift sensor 21, and a wheel speed sensor 22 are electrically connected to each other via an in-vehicle network 23. The in-vehicle network 23 is configured as, for example, a controller area network (CAN). The ECU 14 may control, for example, the brake system 18 by sending a control signal through the vehicle interior network 23. In addition, the ECU 14 may receive detected results from, for example, a torque sensor 12b, the acceleration sensor 13, a brake sensor 18b, the steering angle sensor 19, the accelerator sensor 20, the shift sensor 21, and the wheel speed sensor 22 through the in-vehicle network 23. In addition, the ECU 14 may receive an instruction signal from, for example, the operation input unit 9. The ECU 14 is an example of the display control device.

Here, major features of the display control device will be described.

Figure 4:
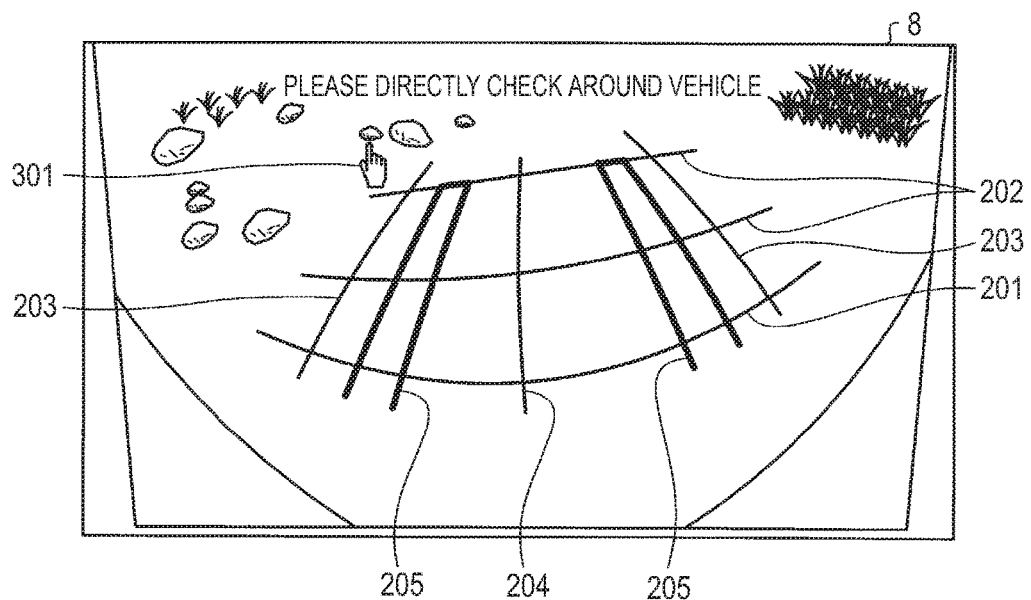
FIG. 4 is a view illustrating an exemplary input for designating a point according to the embodiment.

The display control device displays an image obtained by imaging the peripheral environment on the display screen 8. FIG. 4 is a view illustrating the exemplary display of the display screen 8. In this example, an image which is acquired by the imaging unit 15a and in which the peripheral environment in the front direction of the vehicle 1 is captured is displayed on the display screen 8. On the display screen 8, a line 201 that indicates the front end 2c of the vehicle 1, two lines 202 spaced apart from the front end 2c of the vehicle body 2 by a predetermined distance, two lines 203 that indicate courses along which the left and right ends 2d and 2f of the vehicle body 2 proceed when the vehicle 1 goes straight, a line 204 that indicates a course along which the center of the vehicle body 2 passes when the vehicle 1 goes straight, and two display objects 205 that indicate predicated courses of the two left and right front wheels 3F are superimposed on the image in which the peripheral environment in the front direction of the vehicle 1 is captured. As illustrated in FIG. 4, the display objects 205 are, for example, frame lines having a width corresponding to the width of tires. Hereinafter, the respective lines 201 to 204 and the display objects 205 are written as auxiliary information.

In the state of FIG. 4, the display control device may receive an operation input for designating a point on the image that is being displayed via the operation input unit 9. The point on the image is, in other words, a position on the image, and coordinate values on the image. For example, when the driver touches a point 301, the display control device displays a mark 401 on the point 301.

Figure 5:
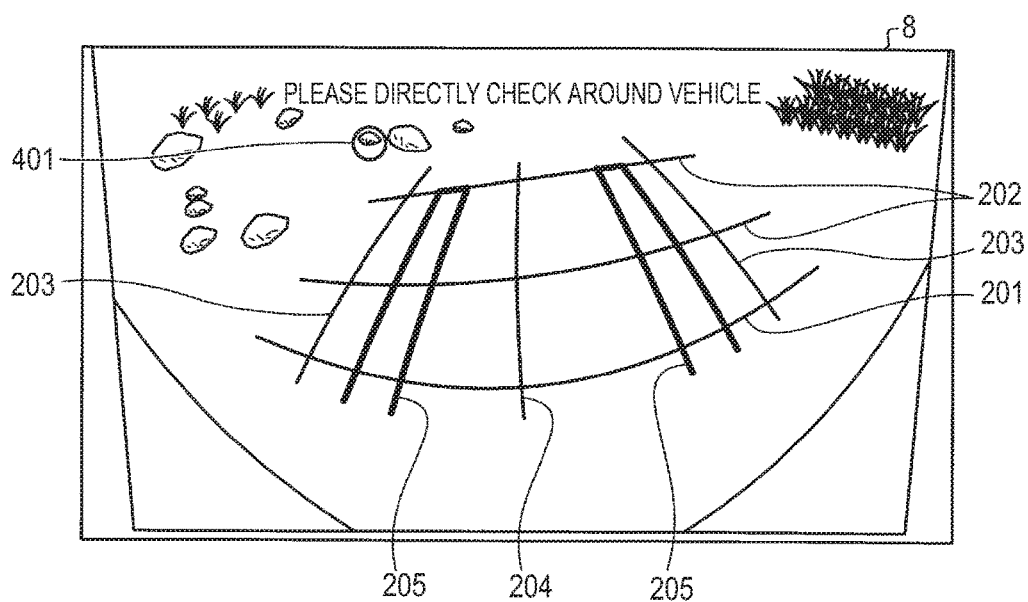
FIG. 5 is a view illustrating a display example of a mark according to the embodiment.

FIG. 5 is a view illustrating the display example of the display screen 8 in a state where the mark 401 is displayed. Here, the mark 401 is a display object having a circular frame line.

The mark 401 is a dedicated display object prepared in advance. The display shape of the mark 401 (form, color, and size) may be arbitrarily designed. The mark 401 serves to indicate a target that is located at the point 301, and in other words, serves to mark the target located at the point 301 on the display screen 8. Thus, in an example, the mark 401 is a display object that is processed to be translucent so as to allow the target located at the point 301 to be visible through the mark 401. The mark 401 may be a display object having only a frame line. In addition, the shape of the mark 401 is, for example, a circular shape, a rectangular shape, or a flag shape. In addition, the display control device may suggest various display shapes of the mark 401 to the user for selection. The display control device may display the selected display shape of the mark 401 at the point 301.

When the driver drives the vehicle 1 after the mark 401 is displayed, the peripheral environment relatively varies with respect to the vehicle 1 according to the movement of the vehicle 1. The display control device periodically acquires images and sequentially updates the display screen 8 with the acquired images. That is, after the peripheral environment is changed, the display control device updates the image on the display screen 8 into an image in which the changed peripheral environment is captured.

Figure 6:
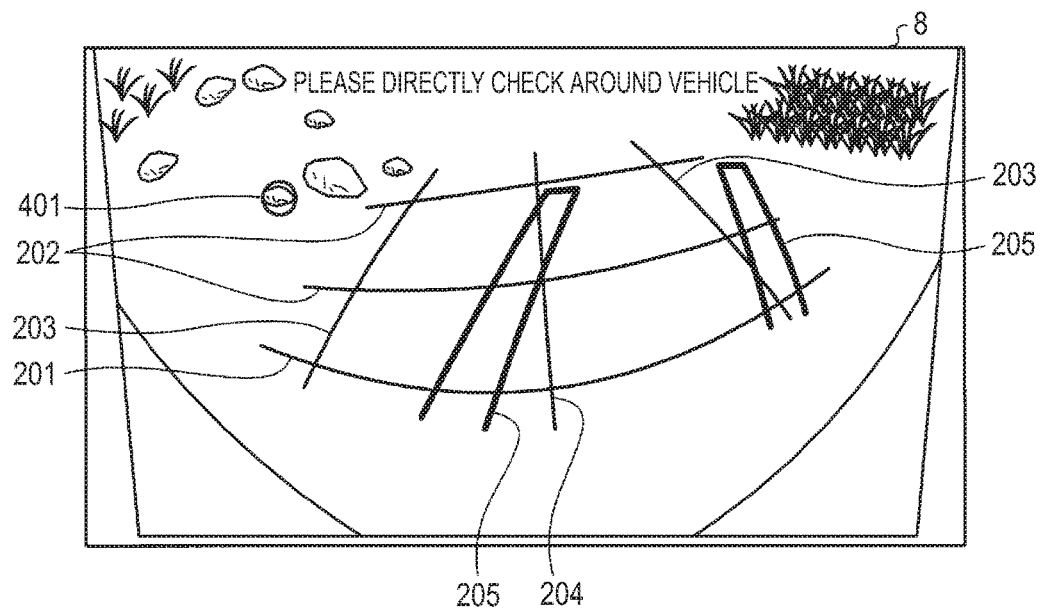
FIG. 6 is a view illustrating a display example according to the embodiment after update.

FIG. 6 is a view illustrating the display example of the display screen 8 after updating. The display control device specifies a position at which the target, which is located at the point 301 in the image of FIG. 4, is located in the image after updating, and displays the mark 401 at the specified position. For example, the display control device displays the mark 401 at a point at which a certain target (e.g., a rock) is located in an image in which the peripheral environment at a certain timing is captured. Then, when the position at which the target is located is moved in the image after updating in which the peripheral environment at a subsequent timing is captured, the display control device causes the mark 401 to follow the position at which the target is located. The driver is able to designate a target, to which the driver is paying attention, on the display screen 8, thereby allowing the mark 401 to be displayed at a position at which the target is displayed. In addition, since the mark 401 follows the position at which the target is located when the position at which the target is located is moved due to traveling, the user does not lose the sight of the target on the display screen 8. That is, the display control device of the embodiment may display the target to which the user is paying attention, in an easily intelligible manner.

In addition, the driver may refer to auxiliary information for steering. When the display control device displays auxiliary information, the driver may easily grasp the positional relationship between the target, to which the driver is paying attention, and the current position of the vehicle 1 and the positional relationship between the target, to which the driver is paying attention, and the predicted position of the vehicle 1. In addition, the display control device does not necessarily display auxiliary information. In addition, the display control device may not display a part of auxiliary information. In addition, the display control device may perform switching between display and non-display of the auxiliary information according to a user operation input.

Figure 7:
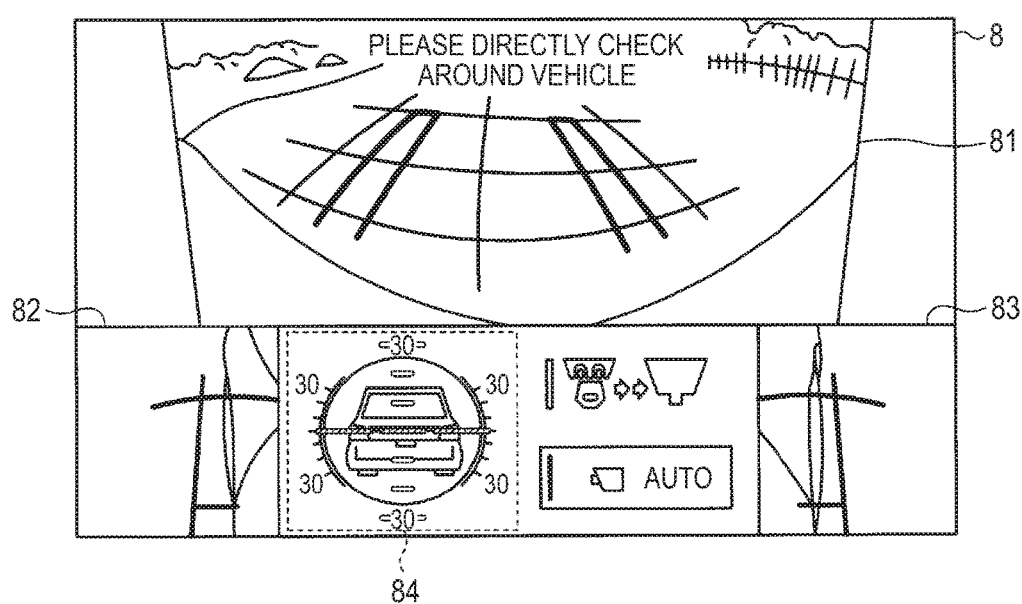
FIG. 7 is a view illustrating another exemplary display screen according to the embodiment.

In addition, the display control device may display different pieces of information in parallel on the display screen 8. FIG. 7 is a view illustrating another display example of the display screen 8. In FIG. 7, an image which is acquired by the imaging unit 15a and in which the peripheral environment in the front direction of the vehicle 1 is captured is displayed on an area 81 of the display screen 8 in the same exemplary shapes as illustrated in FIGS. 4 to 6. In addition, an image which is acquired by the imaging unit 15b and in which the peripheral environment in the left direction of the vehicle 1 is captured is displayed on an area 82 of the display screen 8. In addition, an image acquired by the imaging unit 15d by imaging the peripheral environment in the right direction of the vehicle 1 is displayed on an area 83 of the display screen 8. In addition, an image that shows the tilt of the vehicle 1 in the left-and-right direction is displayed on an area 84 of the display screen 8. The tilt of the vehicle 1 relative to the left-and-right direction is calculated based on, for example, a detected value of the acceleration sensor 13.

Descriptions will be made referring back to FIG. 3. The ECU 14 includes, for example, a central processing unit (CPU) 14a, a read only memory (ROM) 14b, a random access memory (RAM) 14c, a display controller 14d, and an SSD 14e (a solid state drive and a flash memory). The CPU 14a controls the entire vehicle 1. The CPU 14a may read a program that is installed and stored in a non-volatile memory device such as the ROM 14b, and may execute a calculation processing according to the program. The RAM 14c temporarily stores various kinds of data that are used for the calculation of the CPU 14a. In addition, the display controller 14d executes, for example, an image processing using an image that is acquired from each imaging unit 15 and a processing (e.g., synthesis) of an image that is displayed on the display screen 8 among calculation processings in the ECU 14. The SSD 14e is a rewritable non-volatile memory unit, and may store data even when the ECU 14 is powered off. In addition, for example, the CPU 14a, the ROM 14b, and the RAM 14c may be integrated in the same package. In addition, the ECU may use, instead of the CPU 14a, another logical operation processor or logic circuit such as a digital signal processor (DSP). In addition, instead of the SSD 14e, a hard disk drive (HDD) may be installed, and the SSD 14e and the HDD may be provided separately from the ECU 14.

Figure 8:
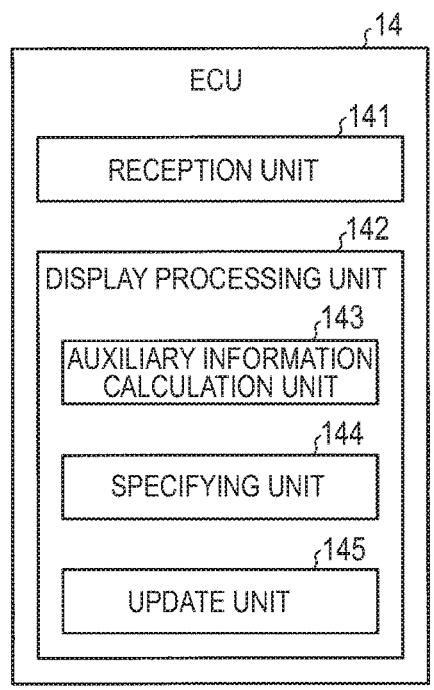
FIG. 8 is a block diagram illustrating a functional configuration of an ECU according to the embodiment.

FIG. 8 is a block diagram illustrating a functional configuration of the ECU 14 according to the embodiment. The ECU 14 mainly includes a reception unit 141 and a display processing unit 142.

The reception unit 141 may receive an operation input for designating a point on an image displayed on the display screen 8, which is input to the operation input unit 9. In addition, the reception unit 141 may receive an operation input for releasing the display of the mark 401, which is input to the operation input unit 9.

Any input method may be adopted as a method for inputting the operation input for releasing the display of the mark 401. For example, when the mark 401 is touched while the mark 401 is being displayed, the reception unit 141 recognizes the touch as the operation input for releasing the display of the mark 401.

Hereinafter, the operation input for designating the point on the image will be referred to as a marking instruction. In addition, the operation input for releasing the display of the mark 401 will be referred to as a display release instruction.

The display processing unit 142 displays an image that shows the peripheral environment on the display screen 8.

Which one of the images obtained from the multiple imaging units 15 is to be displayed on the display screen 8 may be arbitrarily designed. For example, the display processing unit 142 selects one of images obtained from the respective imaging units 15 based on an operation input from the operation input unit 9 or according to preset contents. In addition, the display processing unit 142 displays the selected image on the display screen 8. For example, when a mode for displaying an image of a scene in front of the vehicle 1 is selected or preset, the display processing unit 142 selects and displays an image obtained from the imaging unit 15a.

In addition, the display processing unit 142 may process and display an image from the imaging unit 15 on the display screen 8. The processing includes cutting, masking, synthesis of multiple images, filter processing of some or all of images, display of any display object in addition to the aforementioned objects, correction, and viewpoint conversion. The synthesis of multiple images is, for example, seamless connection of an image which is acquired by the imaging unit 15a and in which the peripheral environment in the front direction of the vehicle 1 is captured and images which are acquired by the imaging unit 15b and the imaging unit 15d and in which the peripheral environments in the left and right directions of the vehicle 1 are captured. The correction is, for example, distortion correction or gamma correction. In one example, viewpoint conversion is to produce a bird's eye view image from the image acquired by each imaging unit 15.

Hereinafter, unless otherwise specified, an image includes not only an unprocessed image, but also a processed image. The image obtained from each imaging unit 15 may be processed at any timing before it is displayed on the display screen 8.

In addition, the display processing unit 142 displays the mark 401 on a designated point when a marking instruction is received by the reception unit 141 while an image is being displayed on the display screen 8. In addition, when a display release instruction is received by the reception unit 141 while the mark 401 is being displayed, the display processing unit 142 terminates the display of the mark 401.

In addition, the display processing unit 142 displays auxiliary information on an image. The auxiliary information is calculated by an auxiliary information calculation unit 143 to be described later.

In addition, the display processing unit 142 sequentially acquires images output from the imaging unit 15 at a predetermined frame rate.

The display processing unit 142 further includes the auxiliary information calculation unit 143, a specifying unit 144, and an update unit 145.

The update unit 145 updates an image displayed on the display screen 8 to an image to be sequentially acquired from the imaging unit 15. At this time, the update rate may differ from a frame rate at which the imaging unit 15 outputs an image.

The update unit 145 updates the display position of the mark 401 when updating the image displayed on the display screen 8. The display position of the mark 401 on the updated image is specified by the specifying unit 144. In addition, the update unit 145 updates auxiliary information when updating the image.

The specifying unit 144 specifies a position at which the target, which is located at the designated point, is located in the image updated by the update unit 145, i.e. the image that shows the peripheral environment of the vehicle 1 at a later timing than the timing when an input for designating the point is received. In addition, the specifying unit 144 notifies the update unit 145 of the specified position.

At this time, in the embodiment, the target, which is located at the designated point, refers to the situation of the peripheral environment that is captured at the designated point on the image. The specifying unit 144 may not specify what is located at the designated point. For example, even if a puddle was located at the designated point, the specifying unit 144 may not identify the target located at the designated point as the puddle.

Hereinafter, the target located at the designated point by the marking instruction is referred to as a designated target. In addition, the position on the image at which the designated target is located is referred to as the display position of the designated target.

Any method may be employed as a method of specifying the display position of the designated target. In one example, the specifying unit 144 calculates and stores a feature amount around the designated point. The specifying unit 144 calculates the feature amount of each area on the image after updating, and searches for a position having a feature amount that coincides with or is closest to the stored feature amount. In addition, the specifying unit 144 specifies the position obtained by searching as the display position of the designated target.

The feature amount is a numerical value of the feature of an image. The calculation algorithm of the feature amount is arbitrary. In addition, the range within which the feature amount is acquired is arbitrary. For example, the specifying unit 144 calculates the feature amount from data of total 9 pixels included in a range that is centered on a pixel located at the designated point, i.e. a rectangular range having a size of three pixels in the vertical direction and three pixels in the horizontal direction.

In addition, the specifying unit 144 may use a variation amount in the state of the vehicle 1 in order to improve searching speed and accuracy based on the feature amount. For example, the specifying unit 144 calculates a movement amount of the vehicle 1 and/or a variation amount in the direction of the vehicle 1 as the variation amount in the state of the vehicle 1 based on detected signals from, for example, the steering angle sensor 19, the accelerator sensor 20, the wheel speed sensor 22, the acceleration sensor 13, a GPS (not illustrated), and the like. In addition, the specifying unit 144 calculates a variation amount in the position of the imaging unit 15 and a variation amount in the optical axis direction of the imaging unit 15 from the variation amount in the state of the vehicle 1. In addition, the specifying unit 144 estimates the display position of the designated target based on the calculated variation amount in the position of the imaging unit 15 and the calculated variation amount in the optical axis direction of the imaging unit 15 and searches for the estimated position in priority.

In another example, the specifying unit 144 may specify a position based on only the variation amount in the state of the vehicle 1. That is, the specifying unit 144 calculates the variation amount in the position of the imaging unit 15 and the variation amount in the optical axis direction of the imaging unit 15, and specifies the display position of the designated target based on the calculated variation amount in the position of the imaging unit 15 and the calculated variation amount in the optical axis direction of the imaging unit 15.

In a further example, the specifying unit 144 may acquire the position of the designated target in the peripheral environment. For example, the vehicle 1 includes a device that may measure the distance to the target and the orientation at which the target is located such as a laser range scanner, a sonar, or a stereo camera. The imaging unit 15 may be a stereo camera. The specifying unit 144 acquires and stores the distance to the target that is located at the designated position and the orientation at which the target is located when an input for designating a point is received by the operation input unit 9. In addition, the specifying unit 144 calculates a position at which the target, which is located at the designated position, is located in the image that is updated by the update unit 145 based on the stored distance and orientation and the variation amount in the state of the vehicle 1.

In this way, the specifying unit 144 may specify the display position of the designated target by any method. In the description of the embodiment, the specifying unit 144 specifies the display position of the designated target based on the feature amount.

In addition, in this embodiment, the specifying unit 144 stores the feature amount of the specified position in an overwriting format so as to use the feature amount for searching at a next update timing. The positional relationship between the designated target and the vehicle 1 is sequentially changed by the driving of the vehicle 1. Therefore, the feature amount of the display of the designated target may be slowly changed according to a timing at which an image is captured. The specifying unit 144 stores, with regard to the feature amount of the display position of the designated target, a feature amount obtained from the latest image in an overwriting format, and uses the feature amount for searching at the next updating timing, thereby improving the probability of successful specifying and the specifying accuracy.

At this time, the specifying unit 144 may not necessarily update the stored feature amount.

The auxiliary information calculation unit 143 calculates auxiliary information whenever an image is updated. Any method may be employed as the calculation method of auxiliary information.

Figure 9:
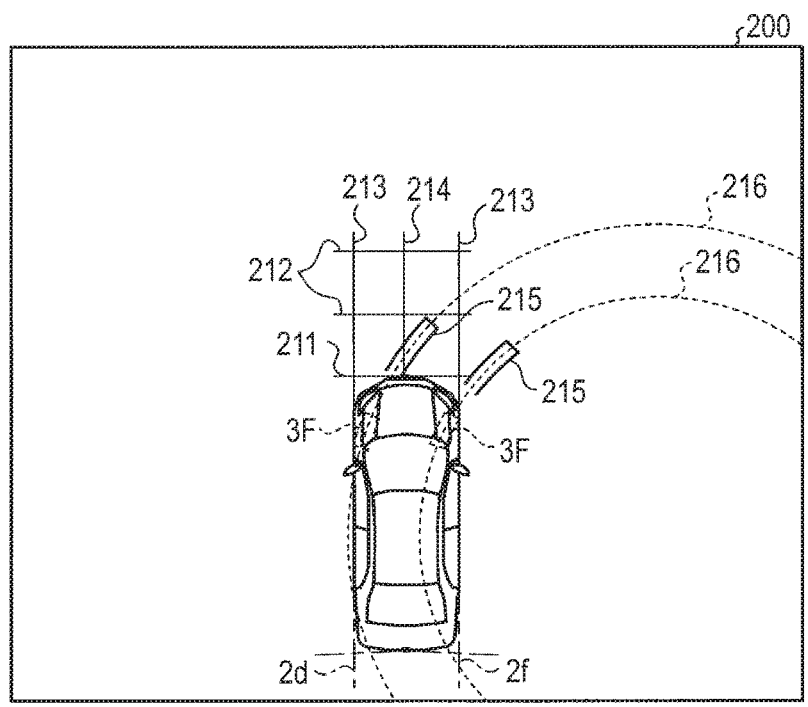
FIG. 9 is a view illustrating an exemplary virtual space for generating auxiliary information according to the embodiment.

In one example, the auxiliary information calculation unit 143 sets a virtual space in which the vehicle 1 is bird-eye-viewed from a position above the vehicle body 2. In the virtual space, the plan view of the vehicle body 2 is set. As illustrated in FIG. 9, the auxiliary information calculation unit 143 first creates auxiliary information on a virtual space 200. The auxiliary information calculation unit 143 sets, in the virtual space 200, a line 211 at the end 2c, sets two lines 212 having predetermined distance values from the end 2c, sets lines 213 on the extensions of the left and right ends 2d and 2f in the front direction of the vehicle 1, and sets a line 214 on the center line of the left and right ends 2d and 2f. In addition, the auxiliary information calculation unit 143 acquires a current steering angle from the steering angle sensor 19, and calculates the courses along which the two left and right front wheels 3F progress when the vehicle moves forward at the acquired steering angle. Two circular arcs 216 represented by dotted lines in FIG. 9 show the courses along which the two left and right front wheels 3F progress. The circular arcs 216 are the portions of circular traces along which the two left and right front wheels 3F move when driving is continued at the current steering angle. The auxiliary information calculation unit 143 sets, in the virtual space 200, display objects 215, which represent the courses along which the two left and right front wheels 3F progress up to a time after a predetermined short time, on the arcs represented by the dotted lines. The auxiliary information calculation unit 143 calculates auxiliary information to be displayed on the image on the display screen 8 by viewpoint converting the lines 211 to 214 and the display objects 215, which are set in the virtual space 200.

Some or all of the reception unit 141, the display processing unit 142, the auxiliary information calculation unit 143, the specifying unit 144, and the update unit 145 are implemented when the CPU 14a configured as the ECU 14 executes a program stored in the ROM 14b. Some or all of the reception unit 141, the display processing unit 142, the auxiliary information calculation unit 143, the specifying unit 144, and the update unit 145 may be implemented by the display controller 14d. Some or all of the reception unit 141, the display processing unit 142, the auxiliary information calculation unit 143, the specifying unit 144, and the update unit 145 may be implemented by a hardware circuit. The specifying unit 144 stores a feature amount in, for example, the SSD 14e or the RAM 14c.

Figure 10:
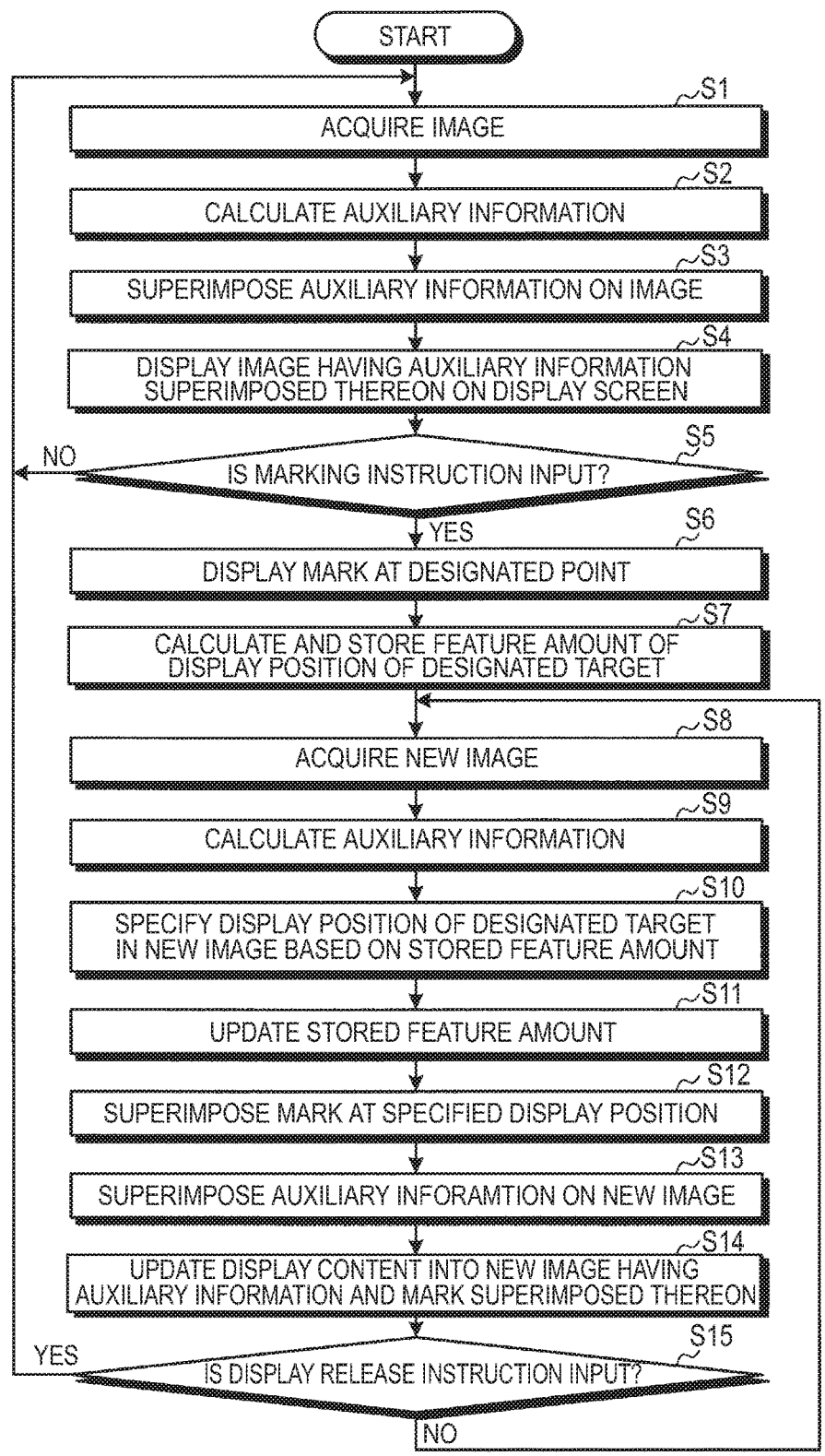
FIG. 10 is a flowchart illustrating an exemplary operation of a display control device according to the embodiment.

Subsequently, the operation of the display control device of the embodiment configured as described above will be described. FIG. 10 is a flowchart illustrating an exemplary operation of the display control device according to the embodiment. Here, as an example, the display control device will be described assuming that an image in which the peripheral environment in the front direction of the vehicle 1 is captured is displayed on the display screen 8 as in the display examples illustrated in FIGS. 4 to 6. That is, in the processing of FIG. 10, the display control device displays an image output from the imaging unit 15a on the display screen 8.

First, the display processing unit 142 acquires an image output from the imaging unit 15a (S1). The auxiliary information calculation unit 143 calculates auxiliary information (S2). The display processing unit 142 superimposes the auxiliary information on the acquired image (S3), and displays the image having the auxiliary information superimposed thereon on the display screen 8 (S4).

Subsequently, the display processing unit 142 determines whether or not a marking instruction is input (S5). When it is determined by the display processing unit 142 that no marking instruction is input (S5: No), the processing returns to S1. That is, in S1, the display processing unit 142 acquires a new image from the imaging unit 15a.

When it is determined that the marking instruction is input (S5, Yes), the display processing unit 142 displays the mark 401 at a designated point (S6). In the processing of S6, the display processing unit 142 superimposes the mark 401 on the image displayed on the display screen 8. The specifying unit 144 calculates and stores the feature amount of the display position of a designated target (S7).

Subsequently, the display processing unit 142 acquires a new image (S8). The new image acquired by the processing of S8 is an image obtained by imaging the peripheral environment after the timing at which the image that is being displayed was captured.

The auxiliary information calculation unit 143 calculates auxiliary information to be superimposed on the new image (S9). The specifying unit 144 specifies the display position of the designated target in the new image based on the stored feature amount (S10). Thereafter, the specifying unit 144 updates the stored feature amount (S11). That is, the specifying unit 144 stores the feature amount of the display position of the designated target in the new image in an overwriting format.

The update unit 145 superimposes the mark 401 on the specified display position (S12), and superimposes the auxiliary information on the new image (S13), thereby updating the display contents of the display screen 8 into the new image on which the auxiliary information and the mark 401 are superimposed (S14). That is, the update unit 145 displays, along with the new image, the mark 401 at the specified display position on the new image. In addition, the update unit 145 may superimpose the auxiliary information and the mark 401 after updating the display content of the display screen 8 to a new image.

The display processing unit 142 determines whether or not a display release instruction is input (S15). When it is determined by the display processing unit 142 that no display release instruction is input (S15: No), the processing returns to S8. When it is determined by the display processing unit 142 that the display release instruction is input (S15: Yes), the processing returns to S1.

In this way, according to the embodiment, the display processing unit 142 acquires an image obtained by imaging the peripheral environment of the vehicle 1 at a certain timing (S1), and when a marking instruction is input (S5: Yes), displays the mark 401 at the designated point by the marking instruction (S6). Thereafter, the display processing unit 142 acquires an image obtained by imaging the peripheral environment after the timing at which the image acquired by the processing of S1 was captured (S8). The specifying unit 144 specifies the display position of the designated target in the new image (S10). The update unit 145 displays, along with the new image, the mark 401 at the specified display position on the new image (S12 and S14). Therefore, since the mark 401 follows the position at which the target designated by the user is located, the display control device may display the target to which the user is paying attention, in an easily intelligible manner.

Here, descriptions have been made in respect to an example in which one mark 401 is displayed. The display control device may display multiple marks 401 on the display screen 8. Specifically, for example, with the processing of S6 or with the processing of S14, the reception unit 141 may receive a new marking instruction while one mark 401 is being displayed. The display processing unit 142 adds the display of the mark 401 to a new point designated by a newly input marking instruction by executing the processing of S6 in response to the newly input marking instruction. That is, the display control device displays the existing mark 401 and the new mark 401 on the display screen 8. Thereafter, the display processing unit 142 acquires an image obtained by imaging the peripheral environment after the timing at which the image that is being displayed was captured and has the existing mark 401 and the new mark 401 superimposed thereon is acquired. The specifying unit 144 specifies each of a position at which the target, which is located at the display position of the existing mark 401, is located in the newly acquired image and a position at which the target, which is located at the display position of the new mark 401, is located in the newly acquired image. In addition, the update unit 145 displays the new image, displays the existing mark 401 at the position at which the target, which is located at the display position of the existing mark 401, is located on the newly acquired image, and displays the new mark 401 at the position at which the target, which is located at the display position of the new mark 401, is located on the newly acquired image.

In this way, since the display control device may display the multiple marks 401 and make the respective marks 401 follow the positions at which the corresponding targets are located, respectively, the user's convenience is improved. For example, when the user marks multiple points that the user wants to avoid or points that the user wants to pass on the route, the respective marks 401 may assist examination of the route.

Figure 11:
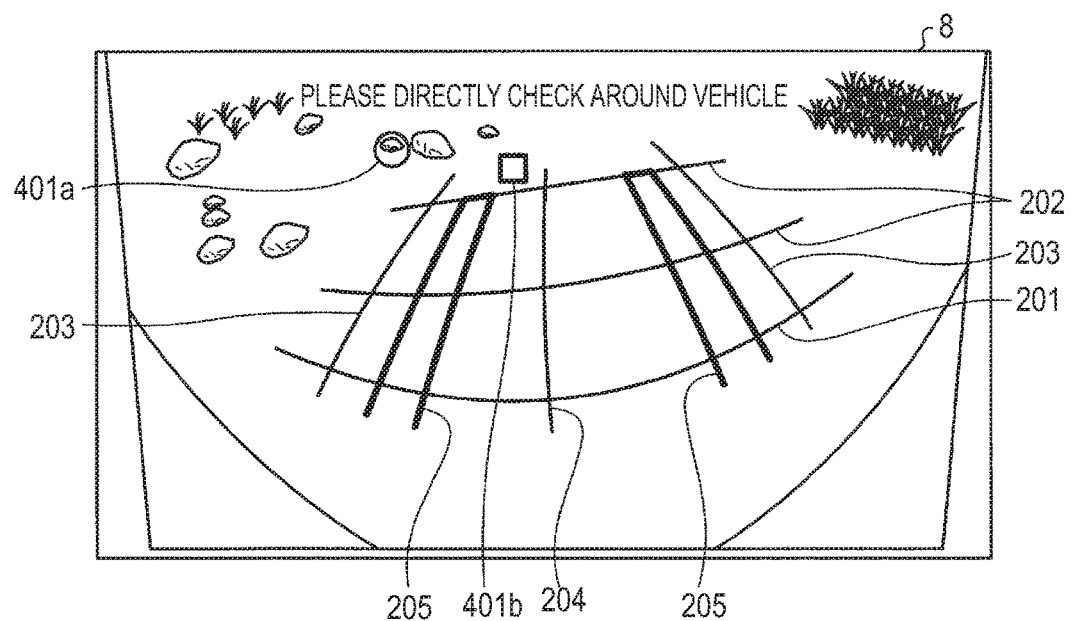
FIG. 11 is a view illustrating another display example of a mark according to the embodiment.

In addition, the display control device may change the display shape of each mark 401 when the multiple marks 401 are displayed on the display screen 8. For example, as illustrated in FIG. 11, one mark 401a has a circular shape and another mark 401b has a rectangular shape. As such, the display control device displays different shapes of display objects for the respective marks 401, and causes the display positions of the marks 401a and 401b to follow the positions at which individual corresponding targets are located. Therefore, since the user may distinguish and mark a target that the user wants to avoid and a target that the user wants to pass on the route from each other, the user's convenience is further improved. In addition, the display processing unit 142 may present multiple display objects to the user so as to allow the user to select the display shape of the display object for each mark 401.

In addition, the display control device may be configured to individually receive an input of a display release instruction for each mark 401 when the multiple marks 401 are displayed on the display screen 8. For example, when receiving an input that touches one of the multiple marks 401 that are being displayed, the reception unit 141 recognizes the input as an input of an instruction to release the display of the touched mark 401. Thereby, the update unit 145 does not perform superimposed display of the touched mark 401 from the time when the processing of S7 is subsequently executed. The specifying unit 144 may delete the stored feature amount concerning the target designated by the display release instruction.

In addition, the display control device may be configured to receive an input of an instruction to collectively release the display of all marks 401. For example, the display processing unit 142 displays a collective deletion button on the display screen 8. When receiving an input that touches the collective deletion button, the reception unit 141 recognizes the input as a display release instruction to collectively release the display of all marks 401. When the display release instruction to collectively release the display of all marks 401 is received by the reception unit 141, the display control device executes the processing of S1.

In addition, the operation input unit that receives the input of the display release instruction is not limited only to the touch panel. The display control device may be configured to enable an input of the display release instruction by operating any operation input unit.

In addition, the release condition of the display of the mark 401 is not limited only to the input of the display release instruction. In one example, when the display position of the designated target deviates from a predetermined area in the display screen 8 or when the display position of the designated target is within a predetermined area in the display screen 8, the display control device may release the display of the corresponding mark 401.

In addition, the display control device may receive an input for designating a trace on the image that is being displayed, and may display a linear display object that follows the designated trace. The display control device causes the linear display object to follow a change in the peripheral environment on the display screen 8.

Figure 12:
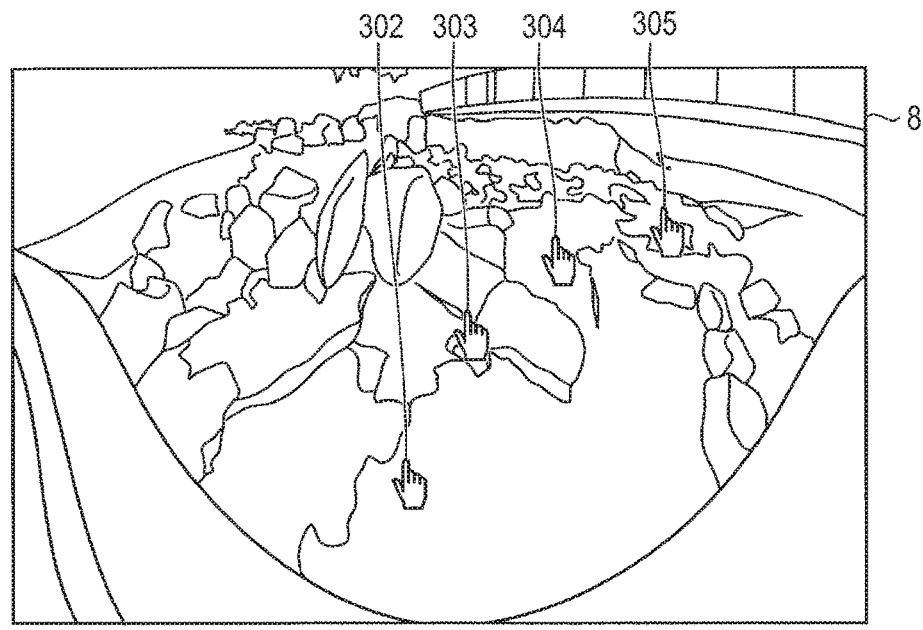
FIG. 12 is a view illustrating an exemplary input for designating a trace according to the embodiment.
Figure 13:
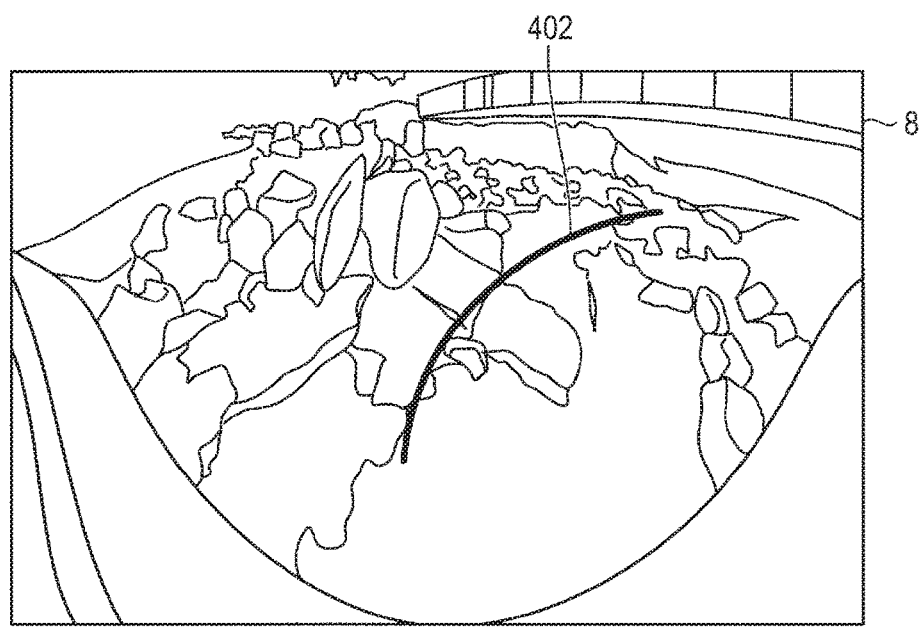
FIG. 13 is a view illustrating a display example of a trace according to the embodiment.

Any management method may be employed as a trace management method. In one example, the display control device manages a trace as a group of points. As illustrated in FIG. 12, when the user slides the finger on the touch panel as the operation input unit 9 from a point 302 to a point 305 by way of a point 303 and a point 304, the reception unit 141 recognizes an input for designating the trace that has the point 302 as a start point and the point 305 as an end point and passes through the point 303 and the point 304. Thus, as illustrated in FIG. 13, the display processing unit 142 displays a line that interconnects the point 302 and the point 303, a line that interconnects the point 303 and the point 304, and a line that interconnects the point 304 and the point 305 as linear display objects 402 each of which follows a trace. Each line that interconnects the points may be a straight line or a curved line. The curved line may be a circular arc or a quadratic curve. When a new image is acquired, the specifying unit 144 specifies a display position at which a target, which is located at each position of the points 302 to 305, is located on a new image, and the update unit 145 produces a linear display object that follows the trace on the new image by interconnecting specified display positions using a line.

In addition, any method may be employed as a method of acquiring a set of points that configure a trace. In one example, the display control device may manage the start point and the end point of a trace as a set of points for configuring the trace. In another example, the display control device may sequentially detect points that the user's finger touches at a constant time interval while the user slides the finger, and may acquire the sequentially detected points as a set of points that configure the trace. In a further example, the display control device may sequentially detect multiple points on the trace at every constant distance, and may acquire the sequentially detected points as a set of points that configure the trace. The number of points to be acquired is, for example, 2 or more.

By configuring the display control device to be capable of displaying a trace, the user may draw a trace that the user wants to pass on the display screen 8, and may perform steering to cause the vehicle 1 to progress along the drawn trace, and as a result, the user's convenience is improved. In addition, when auxiliary information is superimposed and displayed at the same time, the user may perform steering to cause, for example, the drawn trace to follow the display object 205 that indicates the expected course of the front wheels 3F. A method of deleting the drawn trace may be arbitrarily designed. The drawn trace may be deleted after the vehicle 1 passes through the route, or may not be deleted. In addition, the drawn trace may be deleted from the portion that deviates from a predetermined area of the display screen 8.

Figure 14:
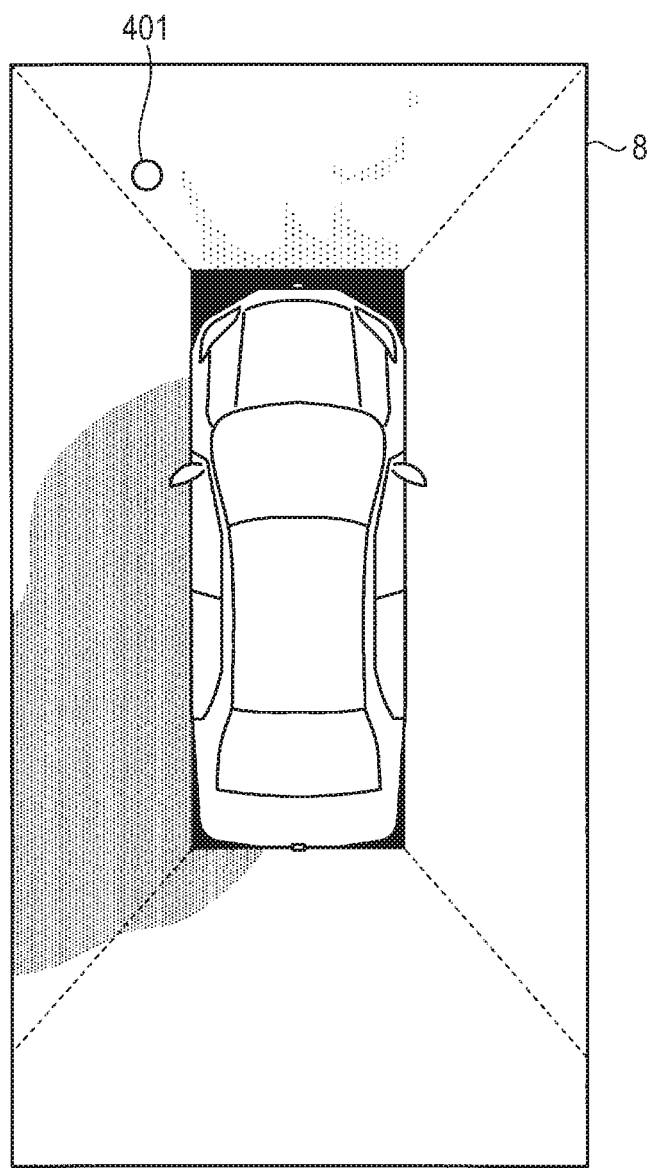
FIG. 14 is a view illustrating a display example of a bird's eye view image according to the embodiment.

In addition, as exemplified in FIG. 14, the display control device may display a bird's eye view image on the display screen 8. In addition, in a case where an operation input of mode switching is input from the user while the image illustrated in FIG. 5 is being displayed, the display control device may switch the image displayed on the display screen 8 to a bird's eye view image illustrated in FIG. 14. The display processing unit 142 produces a bird's eye view image by viewpoint converting and synthesizing an image captured by the imaging unit 15a, an image captured by the imaging unit 15b, an image captured by the imaging unit 15c, and an image captured by the imaging unit 15d. In the example of FIG. 14, for reference, a dotted line is displayed on the seam portion of the image from each imaging unit 15.

In addition, when the mark 401 has been displayed before image switching and a designated target is located on the image after switching, the display control device may display the mark 401 at the position at which the designated target is located on the image after switching. In the example of FIG. 14, the mark 401 is displayed on the portion captured by the imaging unit 15a in the bird's eye view image.

The display processing unit 142 may produce a bird's eye view image on which the mark 401 is superimposed by viewpoint conversion and synthesis after the mark 401 is superimposed on the image from the imaging unit 15 by the update unit 145. In addition, after producing the bird's eye view image, the display processing unit 142 may cause the specifying unit 144 to specify the display position of the mark 401, and may cause the update unit 145 to superimpose the mark 401 on the bird's eye view image. The specifying unit 144 may specify the display position of the designated target on the bird's eye view image, and may specify the display position of the designated target on multiple images before the bird's eye view image is produced.

In addition, as in the display example of FIG. 7 or the display example of FIG. 14, when images from the multiple imaging units 15 are displayed on the display screen 8 directly or after processed, the specifying unit 144 may increase the search range not only to an image from one imaging unit 15 but also to an image from another imaging unit 15. For example, there is a case in which a marking instruction is input via the image from one imaging unit 15, and at a later timing, a designated target is captured on an image from another imaging unit 15 that is oriented to a direction different from that of the one imaging unit 15. In this case, the specifying unit 144 specifies the display position of the designated target on the image from the another imaging unit 15 by searching for the image from the another imaging unit 15. The update unit 145 displays the mark 401 at the specified display position on the image from the another imaging unit 15.

Figure 15:
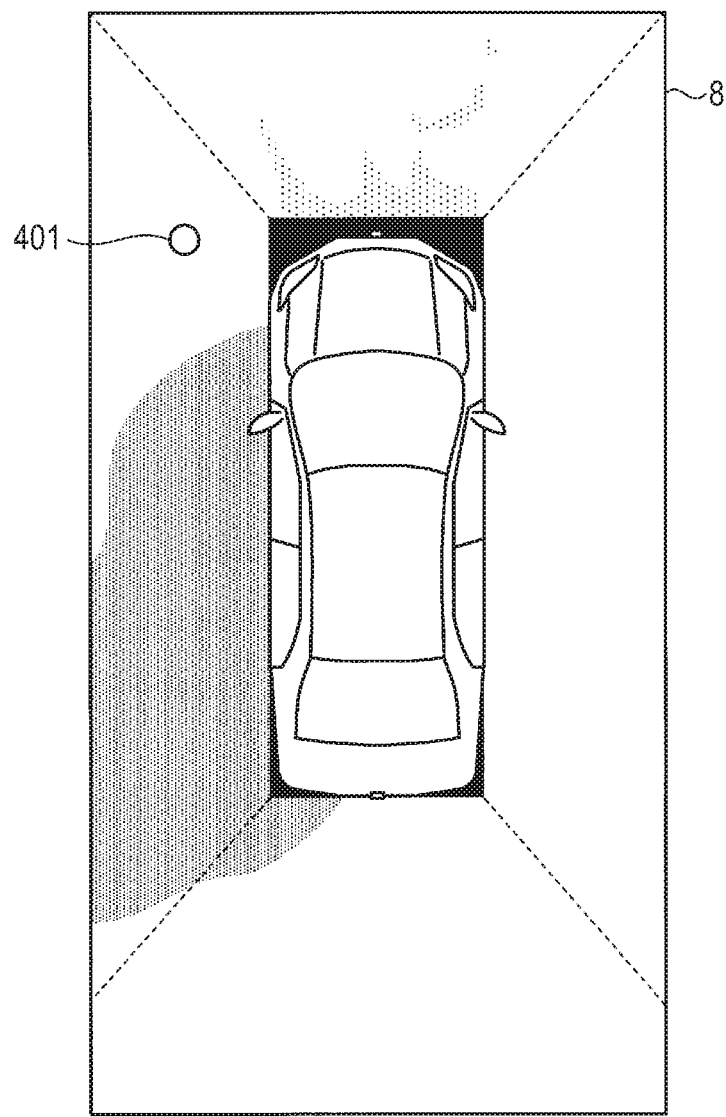
FIG. 15 is a view illustrating a display example of a bird's eye view image according to the embodiment.

For example, in a case where the position of the designated target in the peripheral environment is moved to the left side of the vehicle 1 as the driving is continued after the image exemplified in FIG. 14 is displayed on the display screen 8, the display control device moves the mark 401 to a portion obtained by imaging the left direction of the vehicle 1 by the imaging unit 15b in the bird's eye view image, as exemplified in FIG. 15.

In this way, the display control device specifies the display position of a designated target from multiple images captured by different imaging units 15, and displays the mark 401 at the specified position. Even if the designated target is out of the imaging range of one imaging unit 15, the display control device may display the mark 401 at the display position of the target when the designated target is within the imaging range of the other imaging units 15. Thus, the display control device is capable of displaying the target to which the user is paying attention in an easily intelligible manner.

In addition, when images from the multiple imaging units 15 are individually displayed on the display screen 8 and a designated target is captured in multiple images, the display control device may display the mark 401 on the multiple images in which the designated target is captured.

In addition, the display processing unit 142 may store an image previously acquired from the imaging unit 15, and may produce an image that shows the current peripheral environment based on the stored previous image so as to display the image on the display screen 8. In addition, the display processing unit 142 may display the mark 401 on an image that shows the current peripheral environment produced based on the previous image. In addition, the specifying unit 144 may specify the display position of the designated target from the image that shows the current peripheral environment produced based on the previous image, and the update unit 145 may display the mark 401 at the specified display position.

Figure 16:
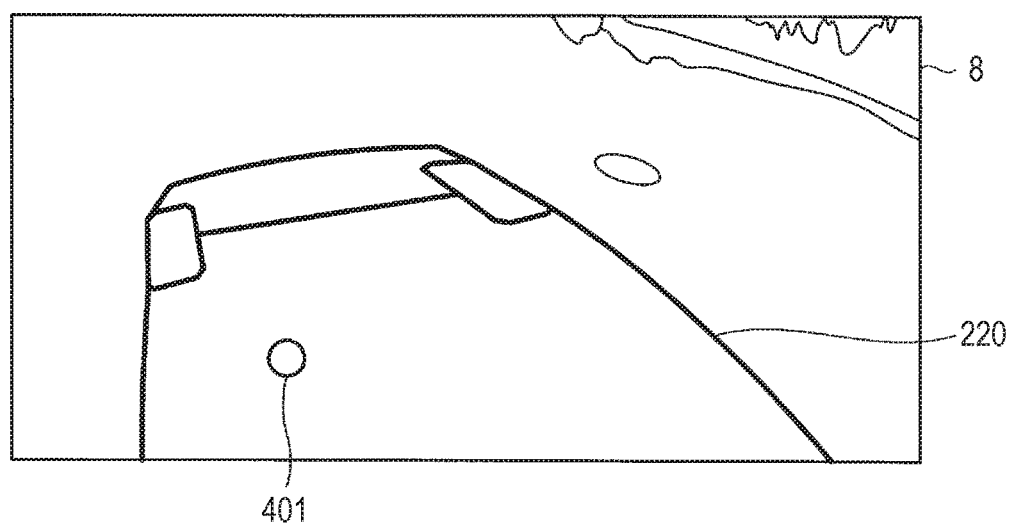
FIG. 16 is a view illustrating a display example according to the embodiment, which displays a part under a floor of a vehicle.

For example, as illustrated in FIG. 16, the display control device may display an image on the display screen to show an area under the floor of the vehicle 1 on the display screen 8. In FIG. 16, a display object 220 is a frame line that indicates the contour of the vehicle body 2. An area surrounded by the display object 220 indicates the road surface under the floor of the vehicle 1. In addition, the mark 401 is displayed on the image that shows an area under the floor of the vehicle 1. The display processing unit 142 stores respective previous images acquired from the imaging units 15a to 15d, and produces the image that shows an area under the floor of the vehicle 1 based on the respective stored images. For example, when the vehicle 1 goes straight, the vehicle 1 passes through the road surface, which is captured in an image captured by the imaging unit 15a at a certain time, at a later timing. Accordingly, when the display processing unit 142 stores the image that is captured by the imaging unit 15 at a slightly earlier timing, the display processing unit 142 may use the image as the image that shows the situation of the road surface through which the vehicle 1 is passing. The display processing unit 142 may use an image captured by the imaging unit 15 excluding the imaging unit 15a, or may be a synthesized image by synthesizing images captured by the multiple imaging units 15. The display processing unit 142 may calculate a variation amount in the state of the vehicle 1 from a timing at which the stored image was captured to a current timing, and may produce an image that shows an area under the floor of the vehicle at a current timing using the calculated variation amount. The display processing unit 142 may produce an image that shows the situation of the road surface, through which the vehicle 1 is passing, by performing a processing such as cutting or viewpoint conversion, on the stored image.

In this way, the display processing unit 142 may produce an image that shows the state of the road surface under the floor of the vehicle 1 at a current timing based on the image captured by the imaging unit at a timing before the current timing. In addition, when the designated target is captured on the image that shows the state of the road surface under the floor of the vehicle 1 at the current timing, the specifying unit 144 may specify the display position of the designated target in the corresponding image, and the update unit 145 may display the image and also display the mark 401 at the specified display position. Accordingly, since the display control device may display an image that shows the peripheral environment outside the imaging range of the imaging unit 15, and may mark the position at which the designated target is located on the image, the user's convenience is improved.

Meanwhile, the method of acquiring the image that shows an area under the floor of the vehicle 1 is not limited to the above description. The imaging unit 15 may be provided on the bottom of the floor of the vehicle 1, and the image that shows an area under the floor of the vehicle 1 may be acquired by the imaging unit 15.

Although the embodiments of the this disclosure have been described above, the embodiments and modifications are merely exemplary, and are not intended to limit the scope of this disclosure. The embodiments or the modifications may be implemented in other various forms, and may be omitted, replaced, combined, or changed in various ways without departing from the scope of the subject matter of this disclosure. In addition, each embodiment or each modification may be implemented by partially changing a configuration or a shape thereof.

As one example, a display control device according to an aspect of this disclosure includes: a reception unit that receives an input for designating a first point on a first image, which is displayed on a display screen provided in a vehicle compartment and shows a peripheral environment of a vehicle at a first timing; a display processing unit that displays a first display object at the first point; a specifying unit that specifies a second point at which a first target, which is located at the first point, is located on a second image, which shows the peripheral environment of the vehicle at a second timing after the first timing; and an update unit that displays, along with the second image, the first display object at the second point on the second image. Accordingly, since the first display object is adapted to follow the position at which the target designated by a user is located, the display control device may display the target to which the user is paying attention, in an easily intelligible manner.

As one example, in the display control device according to the aspect of this disclosure, the reception unit may receive an input for designating a third point on a third image displayed on the display screen, the third image may be an image that has the first display object displayed therein and show the peripheral environment of the vehicle at a third timing, the display processing unit may display a second display object at the third point on the third image, the specifying unit may specify a fourth point at which the first target is located in a fourth image that shows the peripheral environment of the vehicle at a fourth timing after the third timing and a fifth point at which a second target, which is located at the third point, is located in the fourth image, and the update unit may display, along with the fourth image, the first display object at the fourth point on the fourth image and the second display object at the fifth point on the fourth image. Since the display control device is capable of displaying multiple display objects and allowing the display objects to follow the positions where the corresponding targets are located respectively, the user's convenience is improved.

As one example, in the display control device according to the aspect of this disclosure, the first display object may have a display shape that is different from a display shape of the second display object. Accordingly, since an operation of, for example, allowing the user to distinguish and mark a target that the user wants to avoid and a target on a route that the user wants to pass from each other, the user's convenience is further improved.

As one example, in the display control device according to the aspect of this disclosure, the input may be an input that designates two first points, the specifying unit may specify the second point for each first target that is located at each of the two first points, the first display object displayed by the display processing unit may be a line that interconnects the first points, and the first display object displayed by the update unit may be a line that interconnects the second points. Accordingly, since an operation of allowing the user to draw a trace that the user wants to pass on the display screen and to steer the vehicle to travel along the drawn trace, the user's convenience is improved.

As one example, in the display control device according to the aspect of this disclosure, the first image may be captured by a first imaging device, which is provided in the vehicle and faces a first direction, and the second image may be captured by a second imaging device, which is provided in the vehicle and faces a second direction, which is different from the first direction. Even if the position of the designated target is out of the imaging range of the first imaging device, the display object is displayed on the position at which the designated target is displayed when the designated target is within the imaging range of other imaging devices. Thus, the display control device may display the target to which the user is paying attention in an easily intelligible manner.

As one example, in the display control device according to the aspect of this disclosure, the first image may be captured at the first timing by the imaging device provided in the vehicle, the second image may show an area under a floor of the vehicle, and the display processing unit may produce the second image from a fifth image, which is captured by the imaging device at a fifth timing before the second timing. Accordingly, since the display control device may display an image that shows an area under the floor of the vehicle and may mark the position at which the designated target is located, the user's convenience is improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A display control device comprising:
   a processor configured to implement:
      a reception unit that receives at least two points for designating two first points on a first image, wherein the two first points are located at two first targets respectively, which are displayed on a display screen provided in a vehicle compartment and shows a peripheral environment of a vehicle, the first image being acquired by a peripheral information acquiring device at a first timing;
      a display processing unit that displays a first display object being a line that interconnects the two first points;
      a specifying unit that specifies at least two second points at which the two first targets are located on a second image, which shows the peripheral environment of the vehicle, the second image being acquired by the peripheral information acquiring device at a second timing after the first timing; and
      an update unit that displays, along with the second image, the first display object as a line that interconnects the two second points on the second image.

2. The display control device according to claim 1, wherein the peripheral information acquiring device comprises a plurality of imaging devices, the first image is captured by a first imaging device, from among the plurality of imaging devices, which is provided in the vehicle and faces a first direction, and the second image is captured by a second imaging device, from among the plurality of imaging devices, which is provided in the vehicle and faces a second direction, which is different from the first direction.

3. The display control device according to claim 1, wherein the peripheral information acquiring device is provided in the vehicle, the second image shows an area under a floor of the vehicle, and the display processing unit produces the second image from a fifth image, which is acquired by the peripheral information acquiring device at a fifth timing before the second timing.

4. The display control device according to claim 1, wherein the reception unit receives a trace that has one of the at least two points as a start point and another of the at least two points as an end point and passes through a point when a user slides a finger on the display screen, and the display processing unit displays the first display object being the line based on the trace.

5. The display control device according to claim 1, wherein the update unit deletes the first display object based on moving state of the vehicle.

6. The display control device according to claim 3, wherein the fifth timing is a timing when the peripheral information acquiring device acquired the fifth image that shows a road surface under a floor of the vehicle at the second timing.

7. A display control method comprising:
   acquiring a first image at a first timing, wherein the first image shows a peripheral environment of a vehicle;
   displaying, on a display screen, the first image, wherein the display screen is provided in a vehicle compartment;
   receiving at least two points for designating two first points on the first image, wherein the two first points are located at two first targets respectively;
   displaying, on the display screen, a first display object, wherein the first display object is a line that interconnects the two first points;
   acquiring a second image at a second timing, wherein the second image shows the peripheral environment of the vehicle and wherein the second timing is after the first timing;
   specifying at least two second points at which the two first targets are located on the second image; and
   displaying, on the display screen, along with the second image, the first display object as a line that interconnects the two second points on the second image.

8. A display control device comprising:
   a reception means for receiving at least two points for designating two first points on a first image, wherein the two first points are located at two first targets respectively, which are displayed on a display screen provided in a vehicle compartment and shows a peripheral environment of a vehicle, the first image being acquired by a peripheral information acquiring device at a first timing;
   a display processing means for displaying a first display object being a line that interconnects the two first points;
   a specifying means for specifying at least two second points at which the two first targets are located on a second image, which shows the peripheral environment of the vehicle, the second image being acquired by the peripheral information acquiring device at a second timing after the first timing; and an update means for displaying, along with the second image, the first display object as a line that interconnects the two second points on the second image.

* * * * *